(12) United States Patent
Casati et al.

(10) Patent No.: US 7,192,200 B2
(45) Date of Patent: Mar. 20, 2007

(54) OPTICAL COMMUNICATION MODULE

(75) Inventors: Paolo Casati, Sesto San Giovanni (Milan) (IT); Guido Chiaretti, Novate Milanese (Milan) (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/235,770

(22) Filed: Sep. 27, 2005

(65) Prior Publication Data
US 2006/0072882 A1    Apr. 6, 2006

(30) Foreign Application Priority Data
Oct. 5, 2004   (EP)   ................... 04425742

(51) Int. Cl.
G02B 6/42   (2006.01)
G02B 6/43   (2006.01)
(52) U.S. Cl. .......................... 385/89; 385/92
(58) Field of Classification Search ............. 385/92–94
See application file for complete search history.

(56) References Cited

U.S. PATENT DOCUMENTS

| 6,477,286 B1 | 11/2002 | Ouchi | 385/14 |
| 6,663,296 B1 * | 12/2003 | Blair et al. | 385/92 |
| 6,731,882 B1 | 5/2004 | Althaus et al. | 398/139 |
| 6,795,461 B1 * | 9/2004 | Blair et al. | 372/36 |
| 6,807,326 B2 * | 10/2004 | Han et al. | 385/14 |
| 6,985,281 B2 * | 1/2006 | Wagner et al. | 359/315 |
| 2004/0008952 A1 | 1/2004 | Kragl | 385/88 |

FOREIGN PATENT DOCUMENTS

WO   2004031817   4/2004

* cited by examiner

*Primary Examiner*—Michelle Connelly-Cushwa
(74) *Attorney, Agent, or Firm*—Lisa K. Jorgenson; Allen, Dyer, Doppelt, Milbrath & Gilchrist, P.A.

(57) ABSTRACT

The optical communication module can be coupled to at least one optical fiber and includes at least one optoelectronic device, a base portion, and a cover portion which can be connected to the base portion to define an internal chamber to house the optoelectronic device. The cover portion includes at least one window to couple at least one optical signal between the at least one device and the optical fiber. The module further includes a plate, substantially transparent to the optical signal, having a first side facing the cover portion and a second side facing the internal chamber, the first plate substantially enabling sealing of the window. A shielding plate can be connected to the second side and provided with at least one opening substantially aligned with the window to enable passage of the optical signal.

27 Claims, 8 Drawing Sheets

OPTICAL COMMUNICATION MODULE

FIELD OF THE INVENTION

The present invention relates to the field of optical communications, and, more particularly, to an optical communication module and related methods.

BACKGROUND OF THE INVENTION

The use of optical technologies for numerous data communication applications is becoming more and more widespread. For example, the use of optical technologies in popular commercial sectors such as audio, video, personal communication devices and multimedia in general as well as the automotive industry is more and more widespread.

The increasing use of these technologies in popular consumer sectors gives rise to the need to reduce the production costs of the transmission/reception optical devices used in the communication systems based on said technologies. In particular, there is a strong tendency to reduce the production costs of the electro-optical modules which control the transmission/reception of the optical signals. The modules include optoelectronic components, such as optical transmitters or receivers, together with integrated electronic circuits or electronic components commonly required for the use of said optoelectronic components (amplifiers, filters, etc.).

One component which has a particularly high cost in the production of said modules is represented by the external covering (hereinafter also "package"), which generally acts as a protection against the external environment, as a mechanical support and as a shield against electromagnetic radiation for the optoelectronic and electronic components inside said module.

In the production of optical modules, packages made of plastic material are more and more commonly used as an alternative to traditional metal-type packages, notoriously much more expensive. However, the packages in plastic material used today have the drawback of not providing electromagnetic shielding for the module components and have the added disadvantage of being subject to infiltration by air and humidity from the outside, so provoking deterioration and reduced reliability of the optoelectronic and electronic components inside the module.

These problems are aggravated in those applications where the optical module is intended for use in unfavorable environmental conditions or where there is strong electromagnetic interference such as, for example, in the automobile sector. For example, optical networks made in accordance with the MOST Standard (Media Oriented System Transport), use low-cost optical modules and plastic fibers for connection between the various modules.

The use of the standard, initially developed for multimedia applications in the automobile sector, is gradually being extended to other sectors such as the consumers electronic sector (personal computers, home theater systems, etc.). At present, the optical modules used in systems conforming to the MOST standard include optical receivers and transmitters produced as two separate units, each unit comprising a molded plastic package provided with rheophores. Each package includes an optoelectronic component (for example a LED or a photodiode) and further includes electronic circuits associated, if necessary, to the optoelectronic component.

The optical transmitters and receivers so produced are mechanically fixed and electrically connected, by means of the rheophores, to electronic cards so as to form transceiver modules. These modules are provided with a further plastic package which also serves as an interconnection between the transceiver and the plastic optical fibers.

In the case of applications in the automobile sector, these transceiver modules are also normally incorporated into various forms of shielding for protection against electromagnetic emissions. All this complicates assembly and raises the final price of the transceiver module. Furthermore, a problem concerning the reliability of said transmission/receiving modules has been observed in that the optical transmitters and receivers which they contain, despite the fact that they are enclosed in respective molded plastic packages, are damaged by infiltration of humidity through the rheophores of the plastic package.

SUMMARY OF THE INVENTION

In view of the foregoing background, it is therefore an object of the present invention to provide an optical module without the above-described drawbacks of the known art.

BRIEF DESCRIPTION OF THE DRAWINGS

Further features and advantages of the present invention will become more apparent from the following detailed description of an exemplary but non-limiting embodiment thereof, as illustrated in the accompanying drawings, in which.

DETAILED DESCRIPTION OF THE PREFERRED EMBODIMENTS

Figure 1:
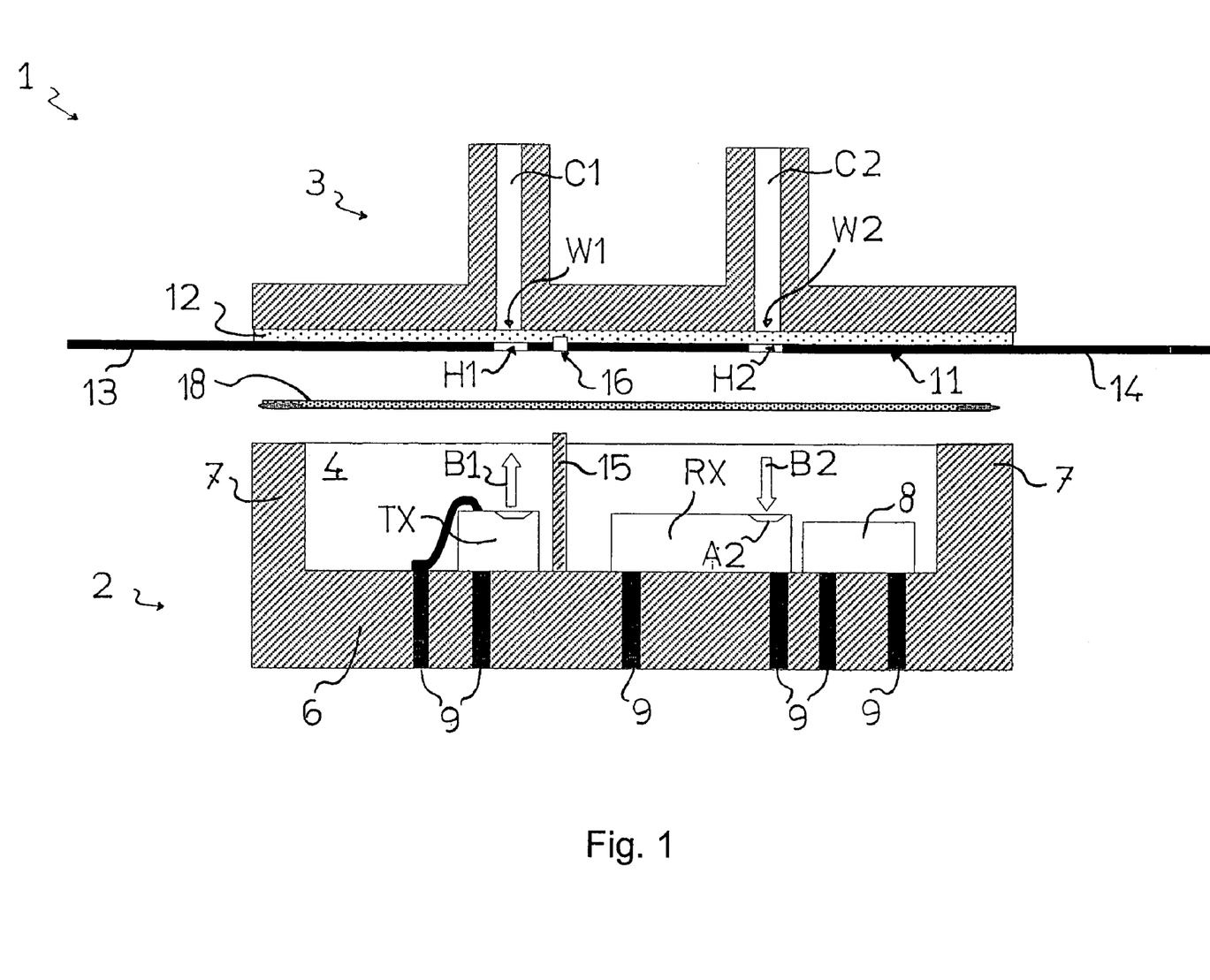
FIG. 1 shows a lateral cross-section, with disassembled parts, of a first embodiment of the optical module according to the invention.

In the figures, equal or identical elements are indicated with the same reference numbers. FIG. 1 schematically represents a lateral cross-section, with parts disassembled, of an optical communication module, or more simply, optical module, generally indicated with 1. The optical module 1, for example, can be advantageously used, but without limitation, as an optical module in an optical communication system produced in conformity with the MOST standard and, for example, can be coupled to at least one optical fiber, for simplicity not represented in FIG. 1, preferably of the plastic type. For example, the optical fiber to be coupled to the module is a plastic fiber with dimensions 980/1000 microns. The module 1 can, however, also be of a size to couple to a glass fiber, for example with dimensions 200/240 microns.

In particular, the optical module 1 includes a base portion 2, or more simply base 2, and a cover portion 3, or cover 3. The base portion 2 and the cover portion 3 can be mechanically connected to each other so as to define a chamber 4 inside the optical module 1. For example, the base portion 2 and the cover 3 can be connected to each other by means of a resin ring 18 suitable to hermetically seal the internal chamber 4. Preferably, to guarantee substantial air tightness of the internal chamber 4, the resin ring 18 is produced in degassed resin. In the embodiment in FIG. 1, the base portion 2 includes a bottom wall 6 and side walls 7 connected to the bottom wall 6. The internal chamber 4 is, therefore, delimited by the bottom wall 6, the side walls 7 and, above, by the cover 3 when this is connected to the base 2.

In a particularly preferred embodiment both the base 2 and the cover 3 are produced in plastic material. Alternatively, the cover 3 is made of ceramic material while the base 2 is made of ceramic material or highly resistive semiconductor material, such as silicon. Inside the chamber 4, at least one optoelectronic component or device is situated, such as for example an optical transmitter or optical receiver.

In the particular embodiment in FIG. 1, the optical module 1 is a module for the transmission and reception of optical signals and includes, therefore, inside the chamber 4, both an optical transmitter TX, for example a Light Emitting Diode, and an optical receiver RX, for example a photodiode. In an alternative embodiment, the optical transmitter TX is a LASER diode of the VCSEL type (Vertical Cavity Surface Emitting Laser).

From now on this description will always refer to the case in which the optical module 1 is of the bi-directional type, i.e. it includes an optical transmitter TX and an optical receiver RX and is intended to be coupled to two optical fibers. The teachings of this description can, however, easily be extended by the skilled in the art to the case in which the module includes only one of the devices or optoelectronic components and is intended to be coupled to a single optical fiber.

In a particularly advantageous embodiment, the optical module 1 further comprises, inside the chamber 4, an electronic circuit having the function of controlling and/or feeding and/or interfacing the optical transmitter TX and the optical receiver RX with the outside of the optical module 1. For example, the electronic circuit comprises an integrated circuit 8. Preferably, the bottom wall 6 of the base portion 2 comprises a plurality of through paths 9 filled with conductive material for electrical connection between the outside of the module 1 and the inside of the chamber 4.

Advantageously, the through paths 9 enable electrical connection of the optical module 1 to an external electronic card, for example by means of surface mounting techniques, known to the skilled in the art and, therefore, not further described herein. Preferably, on the surface of the bottom wall 6 which faces the internal chamber 4, there are conductive tracks, made for example by deposition, to interconnect the transmitter TX and the receiver RX to the integrated circuit 8 and/or to the through paths 9. In this way, the base portion 2 acts also as a substrate for the mounting of the optoelectronic components TX and RX of the integrated circuit 8.

In the embodiment in FIG. 1, the cover 3 of the optical module 1 includes two windows W1, W2 suitable to connect the internal chamber 4 with the outside of the module 1 to couple respective optical signals B1, B2 between optical fibers outside module 1 (not illustrated in the figure) and the optoelectronic components TX and RX container inside chamber 4.

Preferably, the cover 3 further comprises channels C1, C2 communicating with the respective windows W1, W2, having for example cylindrical cross section, housing the ends of the optical fibers intended to interface with the optical module 1. Other interconnection means not illustrated can be provided in the cover 3 so that said cover 3 also connects the optical module 1 with one or more optical fibers. For example, each of the channels C1 and C2 can be produced in such a way that they can house an optical fiber ferrule provided with an optical connector at one end.

Advantageously, the optical module 1 further comprises a plate 12, placed between the base portion 2 and the cover 3, hereinafter also indicated with the name transparent plate 12, produced in glass or any other material transparent to the wave lengths of the optical signals B1, B2 and such as to substantially seal the windows W1, W2 of the cover 3. Advantageously, the optical module 1 further comprises a shielding plate indicated with 11, placed between the transparent plate 10 and the base portion 2. Said plate 11 acts as an electromagnetic shield for the optical module 1 and is, for example, a plate made of metal.

In the particular embodiment in FIG. 1, the transparent plate 10 or glass, includes a surface fixed, for example glued, to the base of the cover 3 and further includes an opposite surface facing inside the chamber 4 and fixed, for example glued, to the shielding plate 11.

Furthermore, in the particular embodiment in FIG. 1, where the plastic fibers to be coupled to the optical module 1 are arranged so that the optical axis of said fibers is perpendicular to the plane on which the bottom wall 6 of the base portion 2 lies (frontal insertion), the glass plate 10 also acts as a stop for the end portions of the optical fibers intended to enter inside channels C1, C2 of the cover 3.

To enable passage of the optical signals B1 and B2, the shielding plate 11 is provided with openings H1 and H2 respectively aligned with windows W1 and W2 of the cover 3 and with the active areas A1 and A2 of the optoelectronic components TX and RX contained inside the chamber 4. In the preferred embodiment in FIG. 1, the shielding plate 11 includes protruding wings 13 and 14 which can be bent over the side walls 7 of the base portion 2 so as to cover, at least in part, said side walls, in this way providing lateral shielding of the optical module 1.

Figure 2:
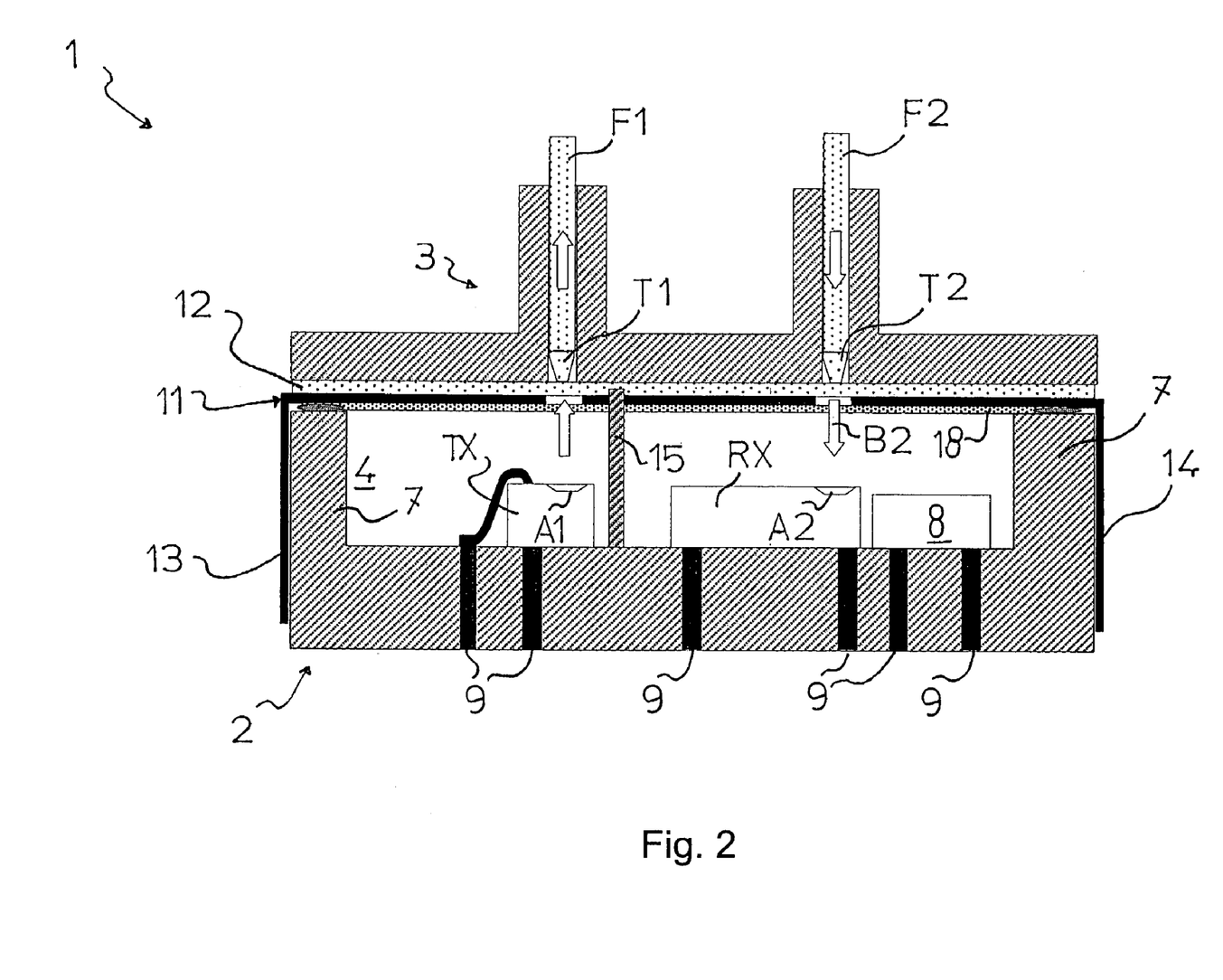
FIG. 2 shows a lateral cross-section, with the parts assembled, of the module in FIG. 1.

Preferably, the optical module 1, when it includes both an optical transmitter TX and an optical receiver RX as in FIG. 1, comprises optical uncoupling means between the transmitter TX and the receiver RX. For example, said optical uncoupling means include one or more internal separation walls 15 placed between the transmitter TX and the receiver RX. In a particularly preferred embodiment, the uncoupling means include means suitable to prevent a guiding effect inside the transparent plate 10 such as, for example, one or more grooves 16, corrugations or discontinuity of various kinds made in said transparent plate 12. Advantageously, this makes it possible to prevent the formation of an undesired optical path between the transmitter TX and the receiver RX inside the optical module 1. In FIG. 2, the optical module of FIG. 1 is illustrated with the cover 3 connected to the base portion 2 by means of the resin ring 18. Furthermore, in said figure the side wings 13 and 14 of the shielding plate 11 are bent over the side walls 7 of the base portion 2.

Moreover, two ends of two optical fibers F1 and F2 connected to the cover 3 are also illustrated.

As shown in FIG. 2, the optical module 1 preferably further comprises means to reduce the optical uncoupling losses between the optoelectronic devices TX and RX and the optical fibers F1 and F2 coupled to the module 1. In a particularly preferred embodiment, said means include, for example, tapering elements T1 and T2 intended to be inserted into channels C1 and C2 of the cover 3 to abut against the transparent plate 12. In FIG. 2, said tapering elements are, for example, elements in resin or glass (or any material transparent to the wavelength used), having a substantially frustoconic shape.

Advantageously, the tapering elements make it possible to considerably reduce uncoupling losses, especially in high bit rate applications, where it is necessary to use transmitters TX or receivers RX with very small respective active areas A1 and A2, i.e. significantly inferior to the characteristic size of the optical fibers F1, F2 intended to be coupled to the optical module 1. High bit rate is intended to mean, for example but not limited to, a bit rate between 50 Mb/s and 200 Mb/s.

Figure 3:
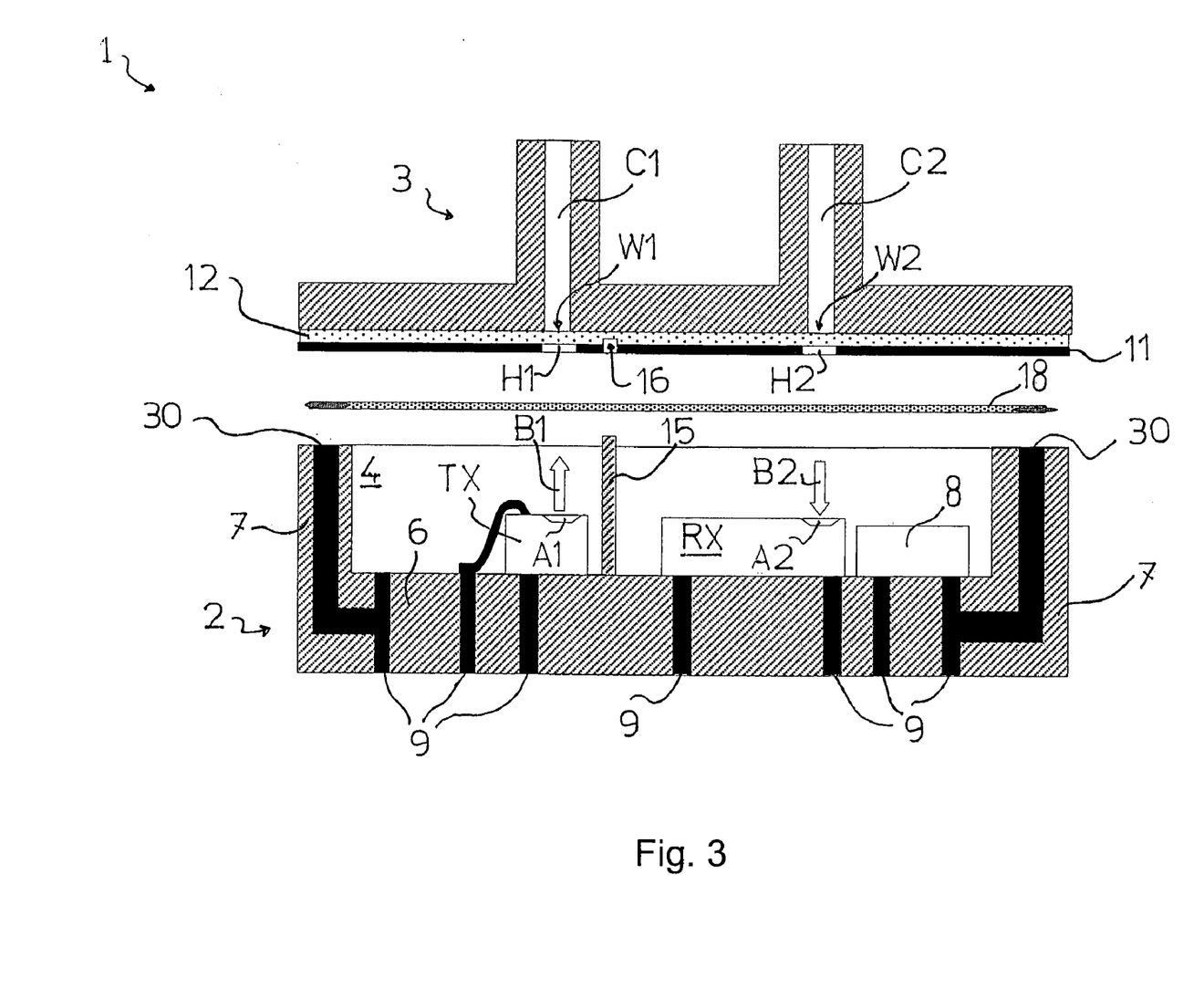
FIG. 3 shows a lateral cross-section, with disassembled parts, of a second embodiment of the optical module according to the invention.

FIG. 3 shows a lateral cross section, with parts removed, of a second embodiment of the optical module 1 according to the invention. The optical module in FIG. 3 differs from the optical module in FIG. 1 in that the side walls 7 of the module are shielded by means of a core 30 in shielding material, for example metal, included inside. Preferably, said shielding core 30 can be connected electrically to the shielding plate 11 by means of a conductive resin ring 18, so as to create electrical continuity between the shielding of the optical module 1 on the side of the cover 3 and the shielding 30 along the side walls of the base portion 2. For example, the ring in conductive resin 18 is made using a silver-loaded resin, preferably degassed. In an alternative embodiment, the ring 18 is a metal alloy ring instead of a conductive resin ring.

Furthermore, by producing the shielding core 30 so that it is electrically connected to one or more through paths 9 made in the bottom wall 6 of the base portion 2, it is possible to produce electrical continuity between the shielding plate 11, the shielding core 30 of the side walls 7 and, if necessary, an assembly card (not illustrated) to which the optical module 1 can be fixed.

Figure 4:
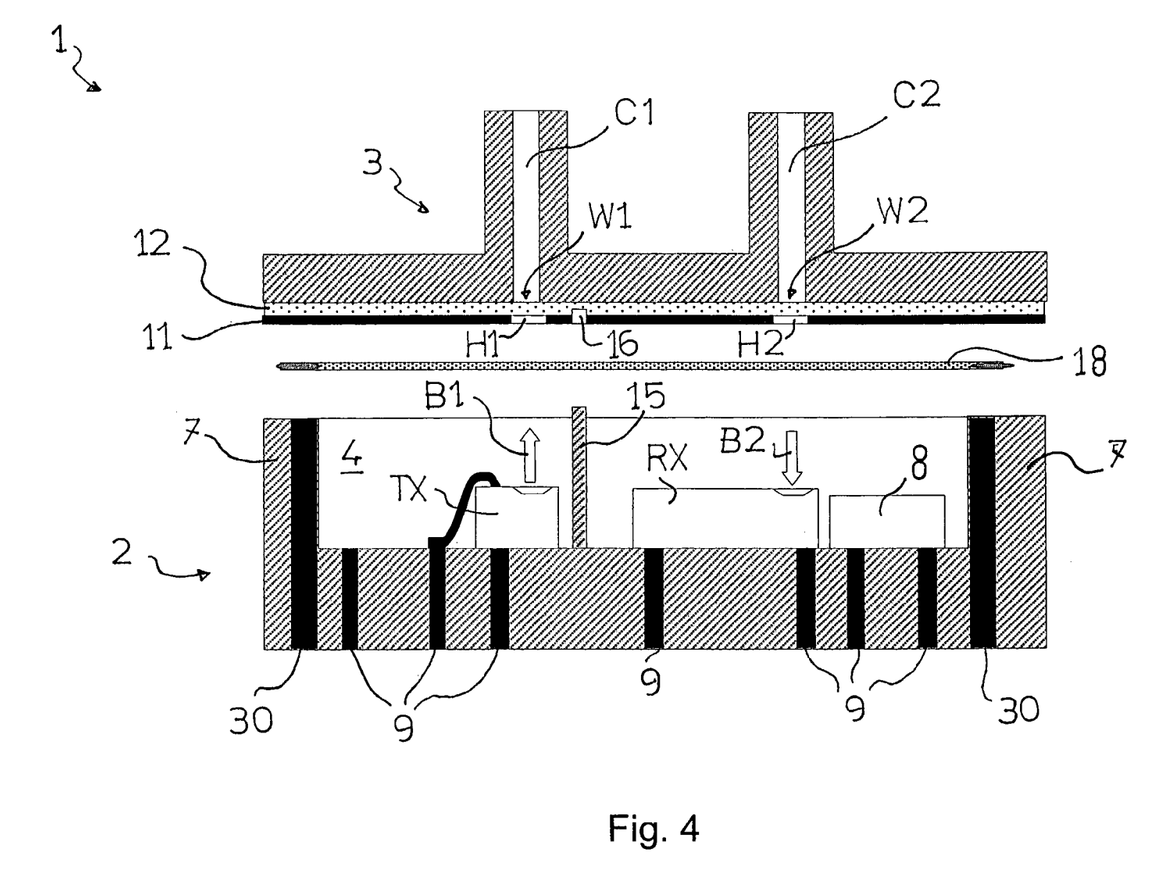
FIG. 4 shows a lateral cross-section, with parts disassembled, of a third embodiment of the optical module according to the invention.

In the embodiment in FIG. 4, the shielding core 30 is not electrically connected to the through paths 9 of the bottom wall 6, but can be directly connected to an assembly card (not illustrated) of the optical module 1. It should be observed that, in the embodiments given in FIGS. 3 and 4, the shielding plate 11 and the shielding core 30 of the side walls form a Faraday cage to protect the internal chamber 4 from electromagnetic interference.

Figure 5:
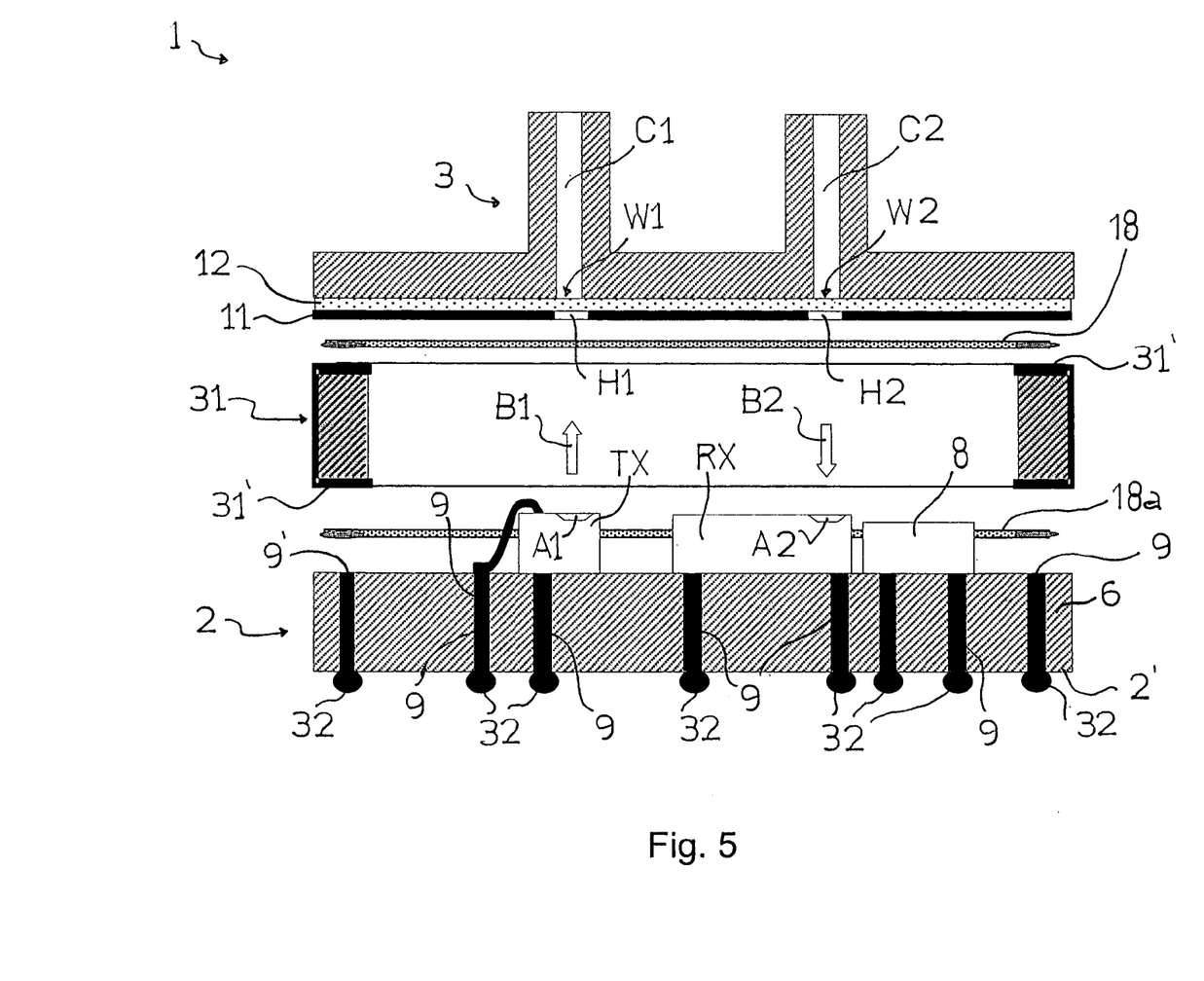
FIG. 5 shows a lateral cross-section, with parts disassembled, of a fourth embodiment of the optical module according to the invention.

FIG. 5 illustrates an embodiment of the optical module 1 in which the side walls of the internal chamber 4 are characterized by a lateral frame 31, distinct from the cover 3 and the base 2. The lateral frame 31 is, for example, a metal frame or, preferably, a frame in plastic material having at least all the walls external to the chamber 4 lined in shielding material, for example lined by means of metallization 31'. The lateral frame 31 can be electrically connected to the shielding plate 11 by means of a first conductive resin or metal alloy ring 18 and to the through paths 9 in the base portion 2 by means of a second conductive resin or metal alloy ring 18a. Furthermore, in the embodiment of the optical module 1 given in FIG. 5, the base portion 2 is provided with spheres of welding paste 32 on the external side 2' of the bottom wall 6. It should be observed that in the embodiment given in FIG. 5, the base portion can also be a common standard BGA (Ball Grid Array) or LGA (Land Grid Array) card.

With the embodiment given in FIG. 5, compared to the other embodiments of optical modules described above, it is possible to simplify assembly/connection operations of the optoelectronic components TX, RX and electronic 8 components inside the optical module 1 to the bottom wall 6. Preferably, in the embodiments of optical modules illustrated in FIGS. 3–5, the shielding plate 11, which in these cases (unlike the optical module in FIGS. 1 and 2) does not include bendable lateral wings, is a thin metal layer produced through deposition on the transparent plate 12.

The embodiments described above with reference to FIGS. 1–5 concern embodiments of an optical module 1 in which the fibers F1, F2 to be coupled to the module 1 are inserted in a direction longitudinal to the optical axis of the optical transmitter TX and/or the optical receiver RX (frontal insertion). For some applications, especially in popular commercial sectors, it may be necessary to couple the fibers F1, f2 to the optical module in such a way that the fibers are inserted laterally, i.e. transversally, compared to the optical axis of the optical transmitter TX and/or receiver RX (lateral insertion).

Figure 6A:
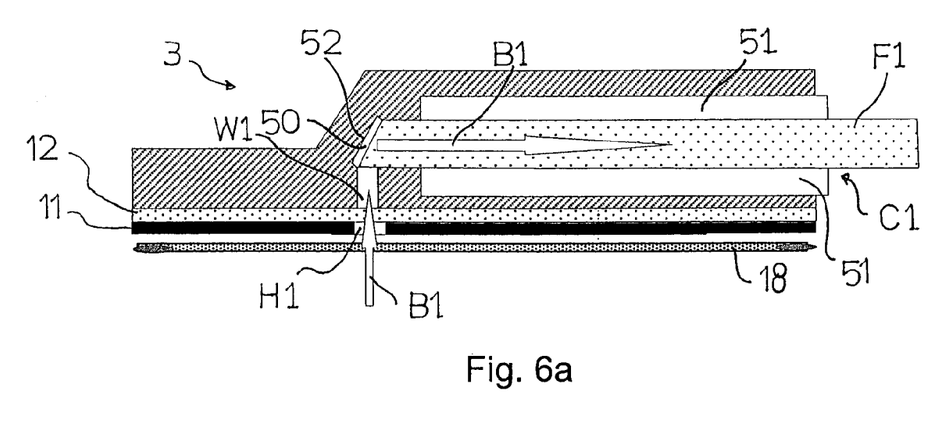
FIGS. 6a and 6b show lateral cross-sections of variations of covers usable in an optical module according to the invention.

As illustrated in FIG. 6a, in this case it is sufficient to modify the structure of the cover 3 so that the latter includes optical deflection means in the optical path defined between the optical transmitter TX and/or the optical receiver RX and the respective optical fiber F1, F2. In the particular embodiment in FIG. 6a, the deflection means include an air chamber 50 between the optical fiber F1, which has one end cut at an angle of 45°, and an internal wall 52 of the cover 3. In this case, deflection of the optical path is obtained through total reflection at the fiber/air interface which is present between the oblique end of the optical fiber F1 and the air chamber 50. It should be observed, furthermore, that in the embodiment in FIG. 6a, the cover 3 is provided with a channel C1 suitable to house a ferrule 51 which represents a portion of the optical fiber F1 connector.

Figure 6B:
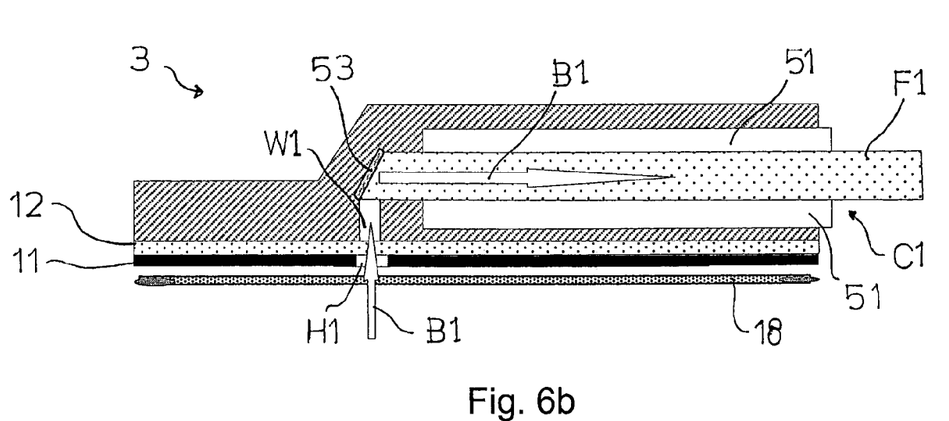

FIG. 6b shows a lateral cross section of an embodiment of the cover in FIG. 6a, in which the deflection means include a reflecting metal surface 52, for example flat and inclined at an angle of 45° compared to the optical axis of the fiber F1, instead of the air chamber 50 in FIG. 6a. The reflecting surface 53 can be obtained either by metallization of the cover 3 or metallization of the end of the fiber F1.

In a particularly preferred embodiment, the reflecting surface 53 is a metallic surface with a concave profile which, besides reflecting the optical signal B1 coupled between the optical module 1 and the optical fiber F1, is able to act as a curved mirror, whether or not astigmatic, to collimate/refocus said optical signal B1 so as to reduce the coupling losses.

Figure 7A:
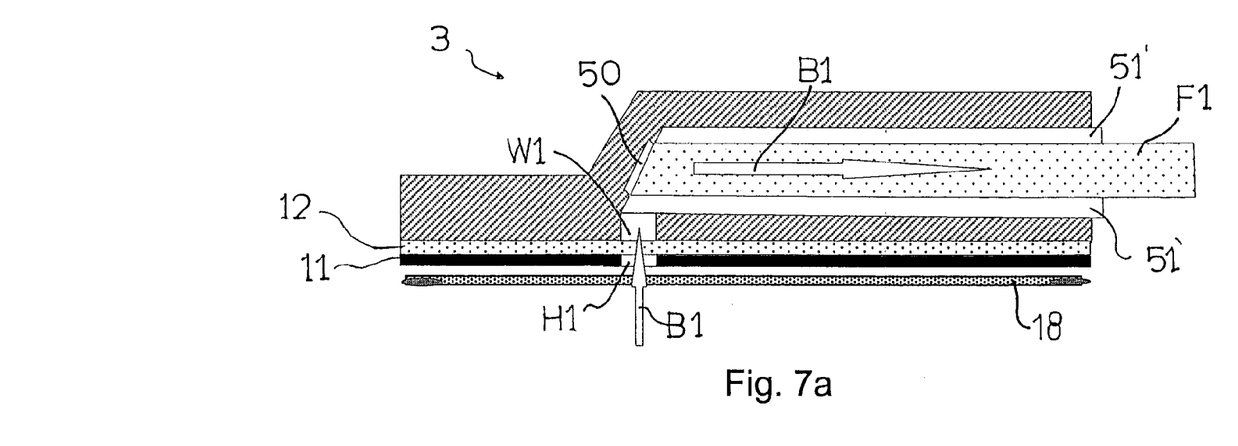
FIGS. 7a and 7b show lateral cross-sections of further variations of covers usable in an optical module according to the invention.

FIG. 7a shows a lateral cross section of a further embodiment of the cover 3. In the embodiment, the structure of the cover 3, compared to the lateral insertion cover 3 given in FIGS. 6a and 6b, facilitates coupling of the fiber F1 to the cover itself. In particular, the channel C1 in FIG. 7b has a structure which permits it to house an angular type ferrule 51' produced in a material transparent to the wavelength of the optical signal B1, for example produced in glass.

In the embodiment given in FIG. 7a, deflection of the beam F1 is brought about by the change in the refractive index between the end of the fiber F1 and the air chamber 50. In another embodiment, similar to the description given above with reference to FIG. 6b, said air chamber 50 can be replaced with a metal layer on the oblique end of the fiber F1 or with a mirror, either flat or curved, incorporated into the cover 3.

Figure 7B:
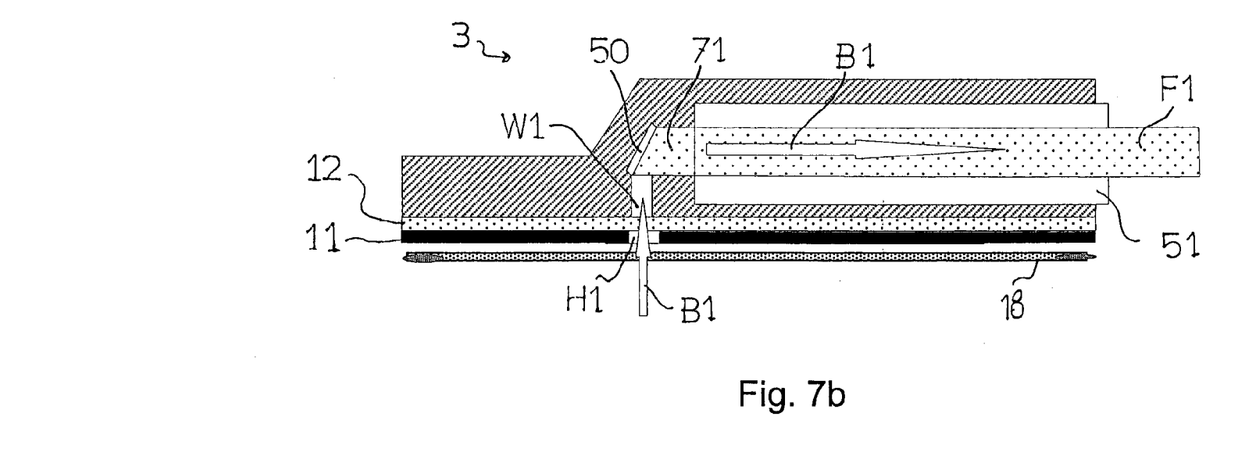

FIG. 7b shows a lateral cross section of a further embodiment of the cover 3. In the embodiment, the structure of the cover 3, compared to the lateral insertion cover 3 given in FIGS. 6a, 6b and 7a, further facilitates coupling of the fiber F1 to the cover itself. In particular, in FIG. 7b the deflection means of the cover 3 include a short section of fiber 71 cut obliquely and fixed inside the cover 3. Preferably, the section of fiber 71 cut obliquely is incorporated into the cover 3 while the latter is being produced by molding.

In the embodiment given in FIG. 7b, deflection of the beam F1 is brought about by the change in the refractive index between the incorporated section of the fiber 71 and the air chamber 50. In another embodiment, similar to the description given above with reference to FIG. 6b, said air chamber 50 can be replaced with a metal layer on the oblique end of the incorporated section 71 of the fiber or with a mirror, either flat or curved, incorporated into the cover 3.

In a further embodiment, not illustrated in the figures, deflection is obtained by using a section of fiber incorporated into the cover 3 which is bent so that it forms an angle of approximately 90° and such as to abut against the glass 12 instead of the section of incorporated fiber 71. Since the above-described embodiments, with reference to FIG. 7b, do not require connection of the cover 3 to the oblique section of fiber F1, they have the advantage of simplifying connection of the cover 3 to the external optical fiber F1.

Figure 8:
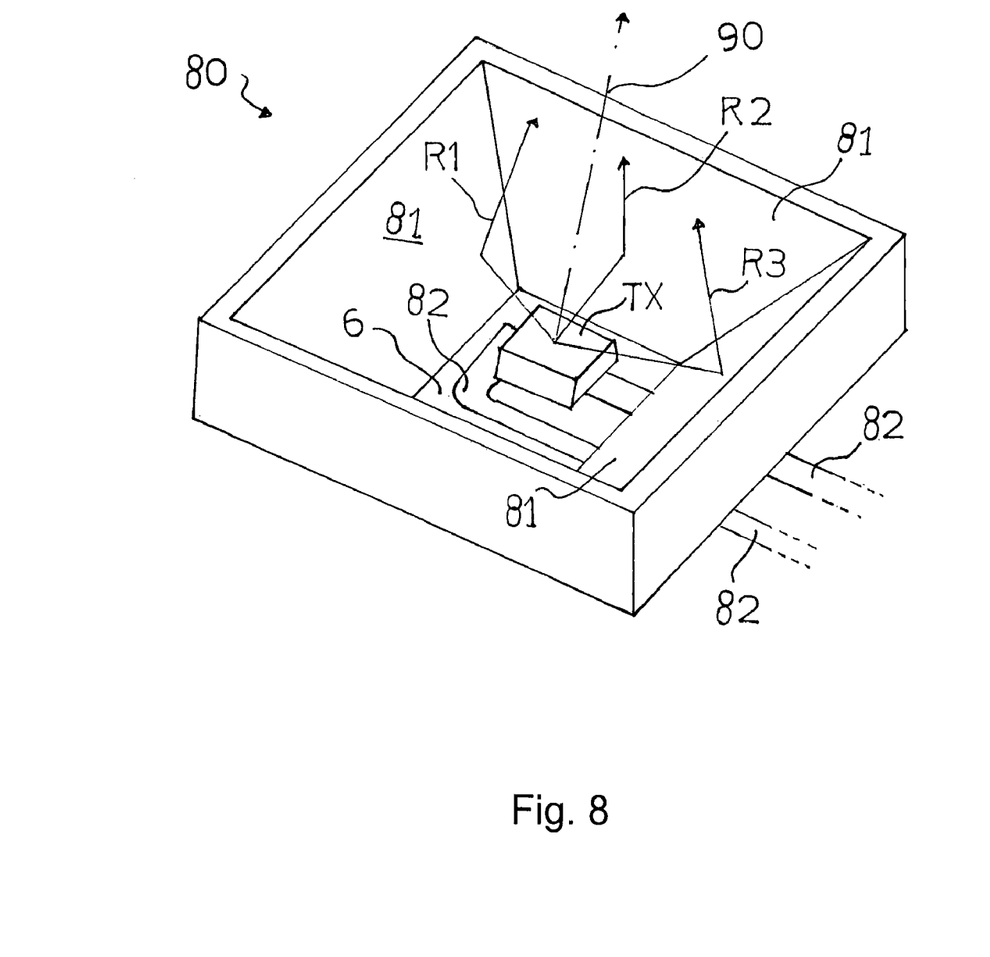
FIG. 8 shows a view from above of a particular embodiment of a collector which can be advantageously used in an optical module according to the invention.

As illustrated in FIG. 8, in a particularly advantageous embodiment, an optical module according to the invention further comprises an optical collector 80 which enables convergence, substantially along the main emission axis 90 of the optical transmitter TX, of the optical rays R1, R2, R3 emitted by the optical transmitter TX in directions not aligned with the main axis 90.

Preferably, as illustrated in FIG. 8, the collector 80 is substantially shaped like a frame, in the example a square, provided with inclined and reflecting internal walls 81 and being able to be fixed to the bottom wall 6 of the optical module 1 in such a way as to surround the transmitter TX. e it can be observed that the optical collector 80 lies on the same assembly surface as the transmitter TX, where electrical interconnection paths 82 of the optical transmitter TX are also situated. In a preferred embodiment, the portion of the collector between the reflecting walls 81 and the optical transmitter TX can be filled with an optical resin having a refractive index significantly higher than that of air, in order to increase extraction efficiency of photons in output from the transmitter TX. For example, the optical resin has a refractive index greater than 1.5, preferably greater than 2.

The presence of the collector 80 and, possibly, the optical resin to fill the collector, advantageously permits an increase in the efficiency of coupling between the optical transmitter TX housed inside the optical module 1 and an external optical fiber coupled to said module.

On the basis of the above description, it can be observed how the present invention advantageously makes available an optical module which can be produced with considerably reduced production costs compared to the optical modules known in the art. Advantageously, being provided with a substantially airtight internal chamber, an optical module according to this invention possesses excellent reliability characteristics, since it is substantially not subject to infiltration of humidity from the outside.

Furthermore, it should be observed that an optical module according to the invention, being provided with efficient shielding characteristics, can be advantageously used in environments which are particularly unfavorable from the point of view of electromagnetic disturbances, for example in the automobile industry. Finally, it should be observed that some embodiments of optical modules of the type described above, make it possible to obtain excellent coupling efficiency between optoelectronic components inside the module and external optical fibers to be coupled to the module.

Naturally, to satisfy contingent and specific requirements, a person skilled in the art may apply to the above-described optical module according to the invention many modifications and variations, all of which, however, are included within the scope of protection of the invention as defined by the following claims.

That which is claimed is:

1. An optical communication module for coupling to at least one optical fiber and comprising:
    at least one optoelectronic device;
    a base;
    a cover connected to the base to define an internal chamber housing the optoelectronic device, the cover including at least one window to transmit at least one optical signal between said at least one optoelectronic device and the at least one optical fiber;
    a transparent plate having a first surface facing and connected to the cover and a second surface, opposite the first surface, and facing the internal chamber, the transparent plate sealing the at least one window; and
    a shielding plate, between the transparent plate and the base portion, and connected to the second surface of the transparent plate, and including at least one opening aligned with the at least one window.

2. The optical module according to claim 1, wherein said cover comprises a plastic cover.

3. The optical module according to claim 1, wherein said base comprises a plastic base.

4. The optical module according to claim 1, wherein said shielding plate includes a layer of metallic material deposited on said transparent plate.

5. The optional module according to claim 1, wherein said transparent plate comprises a glass transparent plate.

6. The optical module according to claim 1, further comprising at least one of a resin ring and metal alloy ring connecting said base to said cover and defining an airtight seal for the internal chamber.

7. The optical module according to claim 1, wherein said at least one optoelectronic device includes at least one of an optical transmitter and an optical receiver.

8. The optical module according to claim 1, further comprising an electronic circuit inside the chanter to define an external interface of said at least one optoelectronic device.

9. The optical module according to claim 1, wherein said at least one optoelectronic device includes both an optical transmitter and an optical receiver for connection to first and second optical fibers.

10. The optical module according to claim 9, further comprising an optical feature to prevent an optical path between said optical transmitter and said optical receiver.

11. The optical module according to claim 10, wherein said optical feature includes at least one internal separation walls between said optical transmitter and said optical receiver.

12. The optical module according to claim 10, wherein said optical feature prevents a guiding effect inside said first transparent plate.

13. The optical module according to claim 1, wherein said base includes a bottom wall provided with a plurality of conductive paths for external electrical connection of the module outside the internal chamber.

14. The optical module according to claim 1, wherein said cover includes a channel communicating with said at least one window for housing a portion of an end of said at least one optical fiber.

15. The optical module according to claim 14, wherein said channel is substantially coaxial with said at least one window.

16. The optical module according to claim 1, wherein said base includes a bottom wall and side walls connected thereto, and said shielding plate includes protruding wings bent over the side walls and covering at least part of said side walls.

17. The optical module according to claim 1, wherein said base includes a bottom wall and side walls connected thereto, said side walls including a shielding core electrically connected to said shielding plate.

18. The optical module according to claim 1, wherein said internal chanter includes side walls having a lateral shielding frame distinct from said base and cover.

19. The optical module according to claim 18, wherein said base portion includes a Land Grid Array (LGA) or Ball Grid Array (EGA) type electronic card.

20. The optical module according to claim 1, further comprising an optical uncoupling reducing device to reduce losses due to optical uncoupling between sad optoelectronic device and said at least one optical fiber.

21. The optical module according to claim 20, wherein said optical uncoupling reducing device comprises a tapering element included in the cover.

22. The optical module according to claim 1, wherein said cover comprises an optical deflector in an optical path between said optoelectronic device and said at least one optical fiber.

23. The optical module according to claim 22, wherein said deflector includes at least one an air chanter, a reflecting element including a flat reflecting surface, a reflecting element including a concave reflecting surface, a curved section of optical fiber incorporated inside said cover and separated from said at least one optical fiber, and a angled end section of optical fiber incorporated inside said cover and separated from said at least one optical fiber.

24. The optical module according to claim 1, wherein said at least one optoelectronic device includes an optical transmitter having a main emission axis, and wherein said optical module further comprises an optical collector for converging, substantially along the main emission axis, optical rays emitted by said transmitter in directions not aligned with the main axis.

25. The optical module according to claim 24, wherein said collector is a frame shaped collector including internal reflecting walls to surround said optical transmitter.

26. The optical module according to claim 25 wherein a portion of said collector between said reflecting walls and said transmitter is filled with an optical resin to increase extraction efficiency of photons from said transmitter.

27. The optical module according to claim 1, wherein said at least one optical signal conforms to the Media Oriented System Transport (MOST) standard.

* * * * *

UNITED STATES PATENT AND TRADEMARK OFFICE
CERTIFICATE OF CORRECTION

| | |
|---|---|
| PATENT NO. | : 7,192,200 B2 |
| APPLICATION NO. | : 11/235770 |
| DATED | : March 20, 2007 |
| INVENTOR(S) | : Casati et al. |

It is certified that error appears in the above-identified patent and that said Letters Patent is hereby corrected as shown below:

| | |
|---|---|
| Column 3, Line 40 | Delete: "the" <br> Insert -- those -- |
| Column 3, Line 57 | Delete: "the" <br> Insert -- those -- |
| Column 7, Line 44 | Delete: "e it" <br> Insert -- It -- |
| Column 8, Line 44 | Delete: "optional" <br> Insert -- optical -- |
| Column 8, Line 54 | Delete: "chanter" <br> Insert -- chamber -- |
| Column 8, Line 66 | Delete: "walls" <br> Insert -- wall -- |
| Column 9, Line 25 | Delete: "chanter" <br> Insert -- chamber -- |
| Column 9, Line 29 | Delete: "(EGA)" <br> Insert -- (BGA) -- |
| Column 9, Line 32 | Delete: "sad" <br> Insert -- said -- |
| Column 10, Line 9 | Delete: "chanter" <br> Insert -- chambers -- |
| Column 10, Line 13 | Delete: "a" <br> Insert -- an -- |

UNITED STATES PATENT AND TRADEMARK OFFICE
CERTIFICATE OF CORRECTION

PATENT NO. : 7,192,200 B2
APPLICATION NO. : 11/235770
DATED : March 20, 2007
INVENTOR(S) : Casati et al.

It is certified that error appears in the above-identified patent and that said Letters Patent is hereby corrected as shown below:

Column 10, Line 24  Delete: "frame shaped"
                    Insert -- frame-shaped --

Signed and Sealed this

Fourteenth Day of August, 2007

JON W. DUDAS
*Director of the United States Patent and Trademark Office*